United States Patent Office.

GUSTAV JÁRMAY, OF WINNINGTON, COUNTY OF CHESTER, ENGLAND.

SEPARATING AMMONIUM CHLORIDE FROM SOLUTIONS BY REFRIGERATION.

SPECIFICATION forming part of Letters Patent No. 356,133, dated January 18, 1887.

Application filed September 2, 1886. Serial No. 212,521. (No specimens.)

*To all whom it may concern:*

Be it known that I, GUSTAV JÁRMAY, a subject of the Emperor of Austria, residing at Winnington, in the county of Chester, in the Kingdom of England, have invented certain new and useful Improvements in Separating Ammonium Chloride from Solutions, of which the following is a specification.

In the manufacture of soda by the ammonia-soda process liquors are obtained containing ammonium chloride, sodium chloride, and carbonates of ammonium and of sodium. In order to obtain ammonium chloride these liquors have hitherto been distilled to get rid of the carbonates, and subsequently partially evaporated and crystallized. This necessarily involves a certain loss of ammonia, a great expense in fuel, and, besides other difficulties, a considerable wear and tear of plant.

My invention consists in separating ammonium chloride from these liquors direct by lowering the temperature of the liquors until a sufficient quantity of ammonium chloride has crystallized out. According to the original strength of the liquor, this quantity will be varied at different temperatures; but to obtain a considerable yield of ammonium chloride I find it preferable to cool the liquors, by means of freezing-mixtures or ice-machines or other well-known means, below zero centigrade. The ammonium-chloride crystals so obtained can be separated from the liquors either by filtration or by means of centrifugal machines, or by any other well-known means. To the mother-liquor as above obtained (or even, at the commencement of the process, to the original liquor) sodium chloride can be added and dissolved preferably to saturation, and the liquor afterward cooled, when an additional crop of ammonium-chloride crystals is secured.

The addition of salt and subsequent cooling can be repeated, if desired. The mother-liquor can now be used again, instead of brine, in the ammonia-soda process, thereby saving the expense of distillation and effecting a great saving of the sodium chloride, which is usually lost in the waste liquors of the ammonia-soda process. If the ammonium chloride is required pure, it may be washed with water or a solution of ammonium chloride, or may be subjected to recrystallization.

I claim as my invention—

1. The process of separating ammonium chloride from the liquors obtained in the ammonia-soda process, which consists in dissolving in the liquor sodium chloride, refrigerating the resultant liquor, separating the crystals of ammonium chloride, again warming and adding more sodium chloride, and again refrigerating and separating the ammonium chloride, then finally using the mother-liquor, preferably, in the ammonia-soda process instead of brine, whereby the expense of distillation at present incurred is saved and the sodium chloride remaining in the mother-liquor is utilized, instead of having to be run to waste, as is usually done with the waste-liquors after distillation.

2. The improvement in the process of obtaining ammonium chloride from liquors obtained in the ammonia-soda process, which consists in reducing the temperature, if necessary, by freezing-mixtures or ice-machines, or any other well-known means, till a sufficient quantity of ammonium chloride is deposited, and separating the so-obtained ammonium chloride.

3. The improvement in aforesaid process, which consists in adding sodium chloride to the warm liquor, cooling the resultant liquor after complete solution, if necessary, by freezing-mixtures or ice-machines, or any other well-known means, till a sufficient quantity of ammonium chloride is deposited, and separating the so-obtained ammonium chloride.

4. The improvement in the aforesaid process, which consists in taking the residual liquor after cooling and after separating the ammonium chloride which is deposited, warming it again, dissolving more sodium chloride, and again cooling and separating the ammonium chloride which is obtained.

5. The process for saving the residual sodium chloride in the ammonium chloride liquor, which consists in adding an additional quantity of sodium chloride to it, separating the ammonium chloride by refrigeration, and then using the mother-liquor, preferably, in the ammonia-soda process instead of brine.

In testimony whereof I have signed my name to this specification in the presence of two subscribing witnesses.

GUSTAV JÁRMAY.

Witnesses:
WM. P. THOMPSON,
J. OWDEN O'BRIEN.